(12) United States Patent
Iwata et al.

(10) Patent No.: US 12,216,732 B2
(45) Date of Patent: Feb. 4, 2025

(54) ESTIMATION APPARATUS, ESTIMATION METHOD AND PROGRAM TO ESTIMATE FUNCTION PARAMETERS AND DATA VALUES

(71) Applicant: NIPPON TELEGRAPH AND TELEPHONE CORPORATION, Tokyo (JP)

(72) Inventors: Tomoharu Iwata, Tokyo (JP); Hitoshi Shimizu, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 308 days.

(21) Appl. No.: 17/295,291

(22) PCT Filed: Nov. 7, 2019

(86) PCT No.: PCT/JP2019/043621
§ 371 (c)(1),
(2) Date: May 19, 2021

(87) PCT Pub. No.: WO2020/105445
PCT Pub. Date: May 28, 2020

(65) Prior Publication Data
US 2024/0012869 A1    Jan. 11, 2024

(30) Foreign Application Priority Data

Nov. 21, 2018 (JP) ................. 2018-218037

(51) Int. Cl.
*G06F 17/11* (2006.01)
(52) U.S. Cl.
CPC ................... *G06F 17/11* (2013.01)
(58) Field of Classification Search
CPC .......... G06F 30/00; G06F 17/11; G06F 16/00;
G06F 16/20; G06N 7/00; G06N 20/00;
G06N 99/00; G06Q 10/04
USPC .......................................................... 703/6
See application file for complete search history.

(56) References Cited

PUBLICATIONS

Iwata, Tomoharu et al., "Estimating People Flow from Spatiotemporal Population Data via Collective Graphical Mixture Models", May 2017, ACM Transactions on Spatial Algorithms and Systems, vol. 3, No. 1, Article 2. (Year: 2017).*

(Continued)

*Primary Examiner* — Cedric Johnson

(57) ABSTRACT

An estimation apparatus includes: input means for inputting aggregated data in which a plurality of data are aggregated, and feature data representing a feature of the aggregated data; determination means for determining a parameter of a model of the plurality of data before the aggregation of the aggregated data, using a predetermined function and the feature data; and estimation means for estimating a parameter of the function and the plurality of data by optimizing a predetermined objective function, using the aggregated data.

20 Claims, 3 Drawing Sheets

(56) References Cited

PUBLICATIONS

McInerney, James et al., "Modeling Heterogeneous Location Habits in Human Populations for Location Prediction Under Data Sparsity", Sep. 8-13, 2013, UbiComp '13, ACM. (Year: 2013).*

Zhuang, Chenyi et al., "Understanding People Lifestyles: Construction of Urban Movement Knowledge Graph from GPS Trajectory", Aug. 2017, Research Gate. (Year: 2017).*

Iwata et al. (2017) "Estimating People Flow from Spatio-temporal Population Data via Collective Graphical Mixture Models" ACM Transactions on Spatial Algorithms and Systems, vol. 9, No. 4, Article 39, 18 pages.

\* cited by examiner

ESTIMATION APPARATUS, ESTIMATION METHOD AND PROGRAM TO ESTIMATE FUNCTION PARAMETERS AND DATA VALUES

CROSS-REFERENCE TO RELATED APPLICATIONS

This application is a U.S. 371 Application of International Patent Application No. PCT/JP2019/043621, filed on 7 Nov. 2019, which application claims priority to and the benefit of JP Application No. 2018-218037, filed on 21 Nov. 2018, the disclosures of which are hereby incorporated herein by reference in their entireties.

TECHNICAL FIELD

The present invention relates to an estimation apparatus, an estimation method and a program.

BACKGROUND ART

For protection of privacy or the like, aggregation of discrete data may be implemented. For example, thin includes such a case as where the data are aggregated into population data of respective rough areas in order to prevent an individual person from being tracked through data of traces of movement of each individual person. When data obtained by aggregating discrete data is provided, various analyses are made possible by estimating a model of discrete data before being aggregated.

As a method for estimating a model of discrete data before being aggregated, collective graphical models has been proposed (see, for example, Non-Patent Literature 1).

CITATION LIST

Patent Literature

Non-Patent Literature 1: Tomoharu Iwata, Hitoshi Shimizu, Futoshi Naya, Naonori Ueda, "Estimating People Flow from Spatio-temporal Population Data via Collective Graphical Mixture Models", ACM Transactions on Spatial Algorithms and Systems, Volume 3 Issue 1, Article No. 2, May 2017.

SUMMARY OF THE INVENTION

Technical Problem

Here, there are cases where various pieces of information (for example, information indicating features of areas, information indicating features of times and information indicating features of areas and times) are obtained together with data obtained by aggregation of discrete data. However, conventionally, such various pieces of information have not effectively been utilized. It is expected that accuracy of estimation of a model of discrete data before being aggregated is to be improved by effectively utilizing these various pieces of information.

An object of the present invention, which has been made in view of the above point, is to provide highly accurate estimation of a model of discrete data when aggregated data is provided.

Means for Solving the Problem

In order to achieve the object, an estimation apparatus according to an embodiment of the present invention includes: input means for inputting aggregated data in which a plurality of data are aggregated, and feature data representing a feature of the aggregated data; determination means for determining a parameter of a model of the plurality of data before the aggregation of the aggregated data, using a predetermined function and the feature data; and estimation means for estimating a parameter of the function and the plurality of data by optimizing a predetermined objective function, using the aggregated data.

Effects of the Invention

Where aggregated data is provided, a model of discrete data can be estimated with high accuracy.

DESCRIPTION OF EMBODIMENTS

Figure 1:
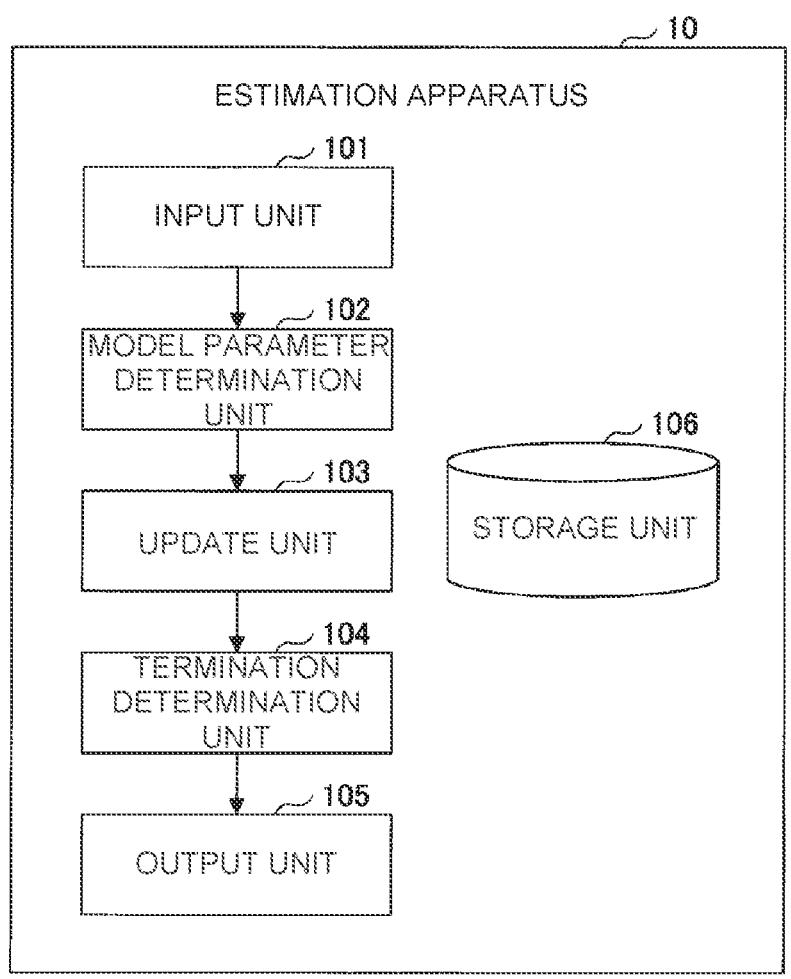
FIG. 1 is a diagram illustrating an example of a functional configuration of an estimation apparatus according to an embodiment of the present invention.

An embodiment of the present invention will be described below. In the embodiment of the present invention, an estimation apparatus 10 that, where aggregated data is provided, estimates a model of discrete data before being aggregated, using various pieces of information as well will be described. Here, the various pieces of information each refer to data representing any sort of feature of the aggregated data. For example, where aggregated data is spatiotemporal data representing populations of respective areas at respective times, each of various pieces of information is information representing features of at least either the areas or the times. More specifically, examples of information representing features of the areas can include, for example, latitude and longitude information and map information and examples of information representing features of the times can include a day of week and a time of day (for example, morning, daytime and night-time), and examples of information representing features of the areas and the times can include, for example, a weather forecast and other spatiotemporal data.

In the below-described embodiment, a case of, where spatiotemporal data indicating populations of respective areas at respective times (hereinafter also referred to as "population data") is provided, estimating a model of movement amount data indicating population flows between respective areas at respective times (hereinafter also referred to as "movement model") from the population data will be described as an example. For the estimation, information indicating features of the areas, information indicating features of the times and information indicating features of the areas and the times are utilized. However, aggregated data to which the embodiment of the present invention is applicable is not limited to population data but is applicable to any aggregated data.

In the embodiment of the present invention, it is assumed that population data $$Y=\{\{y_{tk}\}_{k=1}^{K}\}_{t=1}^{T} \qquad \text{[Formula 1]}$$

is provided. Here, $y_{tk}$ represents a population of an area $k \in \{1, 2, \ldots, K\}$ at a time $t \in \{1, 2, \ldots, T\}$. Also, K represents the number of areas (that is, a total number of indexes of areas) and T represents the number of times (that is, a total number of indexes of times).

Also, it is assumed that where $x_k$ is a vector representing a feature of an area k, $s_t$ is a vector representing a feature of a time t and $u_{tk}$ is a vector representing a feature of an area k and a time t, these vectors $x_k$, $s_t$ and $u_{tk}$ are also provided as data. Examples of the vector $x_k$ representing a feature of an area k can include, for example, latitude and longitude information of the area k and map information of the area k. Also, examples of the vector $s_t$ representing a feature of a time t can include, for example, day of week of the time t and a time of day of the time t. Also, examples of the vector $u_{tk}$ representing a feature of an area k and a time t can include, for example, a forecast of a weather of the area k at the time t and other spatiotemporal data. Note that these vectors are also represented as "feature vectors". The feature vectors may be referred to as "feature data".

Here, as discrete data before being aggregated, movement amount data of amounts of population movement between respective areas at respective times, $$Z=\{\{z_{tk}\}_{k=1}^{K}\}_{t=1}^{T-1} \qquad \text{[Formula 2]},$$

is to be estimated from aggregated data. Here, $$z_{tk}=\{z_{tkk'}\}_{k' \in \mathcal{N}_k} \qquad \text{[Formula 3]}$$

and $z_{tkk'}$ represents the number of persons moved from an area k to an area k' at a time t (that is, the number of movers), and $$\mathcal{N}_k \qquad \text{[Formula 4]}$$

represents an aggregate of areas in the vicinity of the area k.

Therefore, in the embodiment of the present invention, the movement amount data and a movement model are estimated in such a manner that the movement amount data and the movement model agree with the provided population data. An index representing a degree of agreement, for example, a likelihood L(Z) in Formulae (1) and (2) below can be used.

[Formula 5]

$$L(z) = \sum_{t=1}^{T-1} \sum_{k=1}^{K} \sum_{k' \in \mathcal{N}_k} \log p(z_{tk} \mid \theta_{tk}, y_{tk}) \qquad (1)$$

$$p(z_{tk} \mid \theta_{tk}, y_{tk}) = \frac{y_{tk}!}{\prod_{k' \in \mathcal{N}_k} z_{tkk'}!} \prod_{k' \in \mathcal{N}_k} \theta_{tkk'}^{z_{tkk'}} \qquad (2)$$

Here, $\theta_{tkk'}$ is a probability of movement from an area k to an area k' at a time t, and $\theta_{tkk'} \geq 0$ and

[Formula 6]

$$\sum_{k' \in \mathcal{N}_k} \theta_{tkk'} = 1.$$

Note that as described above, in the embodiment of the present invention, a first order Markov model is used as a movement model; however, the present invention is not limited to this example but, for example, a high order Markov model or another model may be used.

Also, there is the restriction indicated in Formula (3) below between the movement amount data and the population data:

[Formula 7]

$$y_{tk} = \sum_{k' \in \mathcal{N}_k} z_{tkk'}, y_{t+1,k} = \sum_{k' \in \mathcal{N}_k} x_{tk'k}. \qquad (3)$$

Also, a parameter of the movement model, $$\Theta=\{\{\theta_{tk}\}_{k=1}^{K}\}_{t=1}^{T} \qquad \text{[Formula 8]},$$

is determined by a function f using provided feature vectors as an input. Here, for the function f, a neural network indicated in Formula (4) below can be used.

[Formula 9]

$$\theta_{tkk'}=f(t,x_k,x_{k'},s_t,u_{tk},u_{tk'};\varphi) \qquad (4)$$

Here, $\varphi$ is a parameter of the neural network. Note that an operator may use a neural network using only some of the feature vectors as an input (for example, a neural network using only some of the feature vectors $x_k$, $x_{k'}$, $s_t$, $u_{tk}$ and $u_{tk'}$ as an input). Also, here, for the neural network, an arbitrary neural network such as a feedforward neural network, a recurrent neural network or a convolutional neural network is used. Also, for the function f, a model that is not a neural network may be used.

In the embodiment of the present invention, the parameter $\varphi$ of the function f, which is a neural network, and the movement amount data Z are estimated in the below-described manner. Here, the estimation is performed in such a manner that the degree of agreement (that is, the likelihood L(Z) indicated in Formulae (1) and (2) above) becomes higher while the restriction indicated in Formula (3) above being met.

Note that in the embodiment of the present invention, the three feature vectors $x_k$, $s_t$ and $u_{tk}$ are provided in addition to the population data Y, the provided data aggregate is not limited to this example. As described above, where a model to which only some of the feature vectors is input is used as the function f, for example, it is possible that only one or two feature vectors from among the feature vectors $x_k$, $s_t$ and $u_{tk}$ are provided.

<Functional Configuration>

First, a functional configuration of the estimation apparatus 10 according to the embodiment of the present invention will be described with reference to FIG. 1. FIG. 1 is a diagram illustrating an example of the functional configuration of the estimation apparatus 10 according to the embodiment of the present invention.

As illustrated in FIG. 1, the estimation apparatus 10 according to the embodiment of the present invention includes an input unit 101, a model parameter determination unit 102, an update unit 103, a termination determination unit 104 and an output unit 105. Also, the estimation apparatus 10 according to the embodiment of the present invention includes a storage unit 106.

The storage unit 106 stores respective pieces of information. In the storage unit 106, for example, population data Y and respective feature vectors $x_k$, $s_t$ and $u_{tk}$ are stored.

The input unit 101 inputs the population data Y and the respective feature vectors $x_k$, $s_t$ and $u_{tk}$. Note that a source from which the population data Y and the respective feature vectors $x_k$, $s_t$ and $u_{tk}$ are input may be the storage unit 106 or may be another device connected via, for example, a communication network.

The model parameter determination unit 102 determines a parameter Θ of a movement model, using the function f indicated in Formula (4) above. The update unit 103 estimates a parameter φ of the function f and movement amount data Z in such a manner that a degree of agreement becomes high while the restriction indicated in Formula (3) above being met, and updates the parameter φ and the movement amount data Z (to be more exact, an estimated value of the parameter φ and estimated values of the numbers of movers $z_{tkk'}$ included in the movement amount data Z).

The determination of the parameter Θ by the model parameter determination unit 102 and the estimation of the parameter φ and the movement amount data Z by the update unit 103 are repeated until a predetermined termination condition is met.

The termination determination unit 104 determines whether or not the predetermined termination condition is met. Here, major examples of the predetermined termination condition are stated below. A first example is that the number of repetitions reaches a predetermined threshold value or more. A second example is that an amount of change in objective function value (for example, likelihood L (Z)) between an i-th repetition and an i+1-th repetition becomes smaller than a predetermined threshold value. A third example is that an amount of change in estimated value of the movement amount data Z between an i-th repetition and an i+1-th repetition becomes smaller than a predetermined threshold value.

If the termination determination unit 104 determines that the predetermined termination condition is met, the output unit 105 outputs the parameter Θ of the movement model and the movement amount data Z. Note that a destination of the output of the parameter Θ of the movement model and the movement amount data Z may be the storage unit 106, may be a display device such as a display or may be another device connected via, for example, the communication network. Also, the output unit 105 may output only either the parameter Θ of the movement model or the movement amount data Z.

<Flow of Processing>

Figure 2:
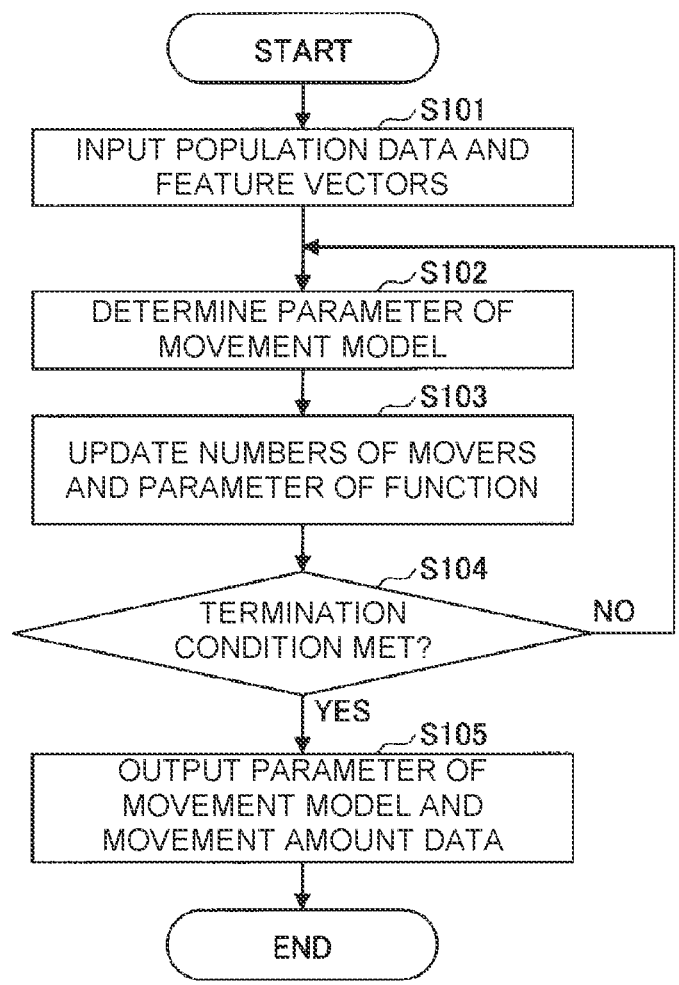
FIG. 2 is a flowchart illustrating an example of processing performed by the estimation apparatus according to an embodiment of the present invention.

Next, the flow of processing performed by the estimation apparatus 10 according to the embodiment of the present invention (estimation processing) will be described with reference to FIG. 2. FIG. 2 is a flowchart and illustrates an example of processing performed by the estimation apparatus 10 according to the embodiment of the present invention.

The input unit 101 inputs population data Y and respective feature vectors $x_k$, $s_t$ and $u_{tk}$ (step S101).

Next, the model parameter determination unit 102 determines a parameter Θ of a movement model using the function f indicated in Formula (4) above (step S102).

Next, the update unit 103 estimates a parameter φ of the function f and movement amount data Z in such a manner that a degree of agreement becomes high while the restriction indicated in Formula (3) above being met. Then, the update unit 103 updates an estimated value of the parameter φ of the function f and estimated values of respective numbers of movers $z_{tkk'}$ included in the movement amount data Z (step S103).

Next, the termination determination unit 104 determines whether or not a predetermined termination condition is met (step S104).

If it is not determined in step S104 that the predetermined termination condition is not met, the processing returns to step S102. Consequently, until the termination condition is met, steps S102 and S103 above are repeated.

On the other hand, if it is determined in step S104 that the predetermined termination condition is met, the output unit 105 outputs the parameter Θ of the movement model and the movement amount data Z (step S105). Consequently, the parameter Θ of the movement model and the movement amount data Z (that is, the numbers of movers $z_{tkk'}$ of movements between respective areas at respective times) are estimated.

<Results of Comparison with Conventional Techniques>

Here, a result of comparison between a result of estimation by the estimation apparatus 10 according to the embodiment of the present invention and results of estimation by conventional techniques will be described. As the conventional techniques to be compared, a collective graphical mixture model (hereinafter represented as "CGMM"), an inhomogeneous transition probability collective graphical model (hereinafter represented as "ICGM"), a collective graphical model (hereinafter represented as "CGM") and a STAY were used. The CGMM is a collective graphical model in which times are segmented into clusters, the ICGM is a collective graphical model having a movement probability that differs depending on the respective times, the CGM is a collective graphical model in which a movement probability is equal through all of times, and the STAY is a method based on the premise that each of all of persons stays at a same location.

Also, as population data, four data on Tokyo, Osaka, Nagoya and Beijing were used. Note that each of the population data on Tokyo, Osaka, Nagoya and Beijing is spatiotemporal data aggregated into a plurality of areas and a plurality of times. Furthermore, for feature vectors provided to the estimation apparatus 10 according to the embodiment of the present invention, latitude and longitude information was used as information representing features of the areas and times of day were used as information representing features of the times.

At this time, a normalized absolute error (NAE) in estimation of the numbers of movers, which is indicated in Formula (5) below, was used as an evaluation index.

[Formula 10]

$$NAE = \frac{\sum_{k=1}^{K} \sum_{t=1}^{T-1} \sum_{k' \in N_k} |z_{tkk'} - \hat{z}_{tkk'}|}{\sum_{k=1}^{K} \sum_{t=1}^{T-1} y_{tk}} \quad (5)$$

Here, $z_{tkk'}$ is data of a correct answer of the number of movers in Formula (5) above, and $$\hat{z}_{tkk'} \quad \text{[Formula 11]}$$

is an estimated value of the number of movers (that is, a result of estimation by the embodiment of the present invention or the conventional techniques).

Comparison results relating to the normalized absolute error in estimation of the numbers of movers are indicated in Table 1 below.

TABLE 1

| | Present Invention | VCGMM | ICGM | CGM | STAY |
|---|---|---|---|---|---|
| Tokyo | 0.148 | 0.167 | 0.176 | 0.208 | 0.192 |
| Osaka | 0.186 | 0.250 | 0.265 | 0.280 | 0.272 |
| Nagoya | 0.227 | 0.250 | 0.281 | 0.291 | 0.269 |
| Beijing | 0.408 | 0.470 | 0.500 | 0.479 | 0.532 |

In this way, the estimation apparatus 10 according to the embodiment of the present invention provides a normalized absolute error in estimation of the numbers of movers, the normalized absolute error being smaller than those of the conventional techniques in each of all the four population data. In other words, it can be understood that the estimation apparatus 10 according to the embodiment of the present invention can estimate discrete data with accuracy that is higher than those of the conventional techniques.

<Hardware Configuration>

Figure 3:
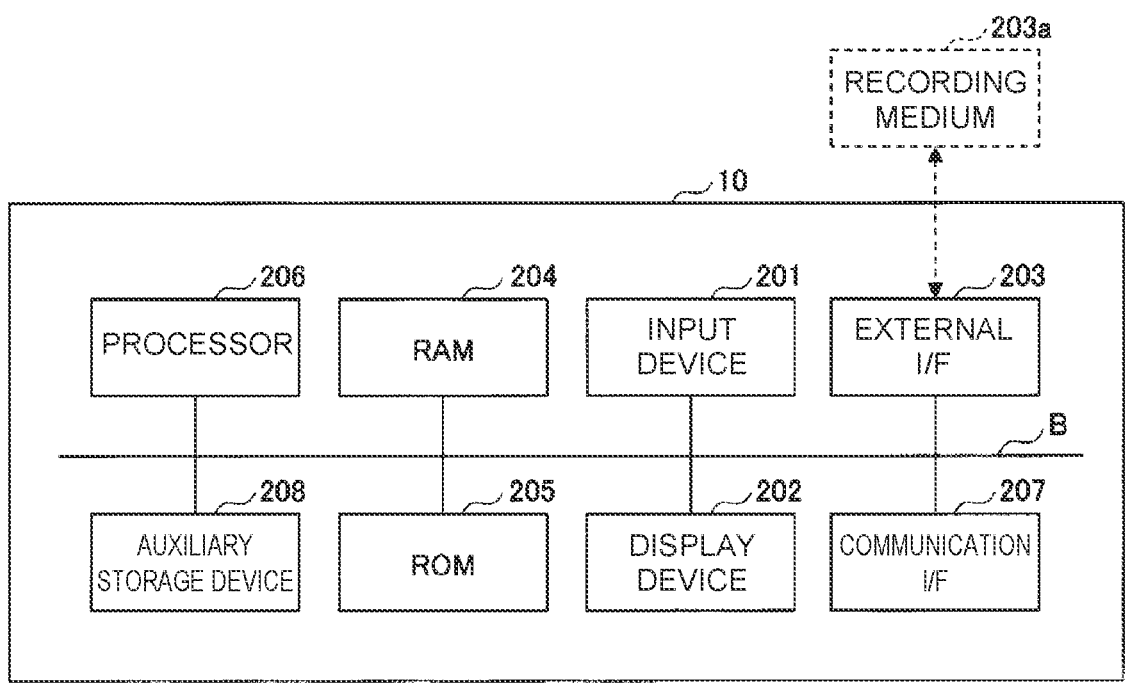
FIG. 3 is a diagram illustrating an example of a hardware configuration of the estimation apparatus according to an embodiment of the present invention.

Lastly, a hardware configuration of the estimation apparatus 10 according to the embodiment of the present invention will be described with reference to FIG. 3. FIG. 3 is a diagram illustrating an example of a hardware configuration of the estimation apparatus 10 according to the embodiment of the present invention.

As illustrated in FIG. 3, the estimation apparatus 10 according to the embodiment of the present invention includes an input device 201, a display device 202, an external I/F 203, a RAM (random access memory) 204, a ROM (read-only memory) 205, a processor 206, a communication I/F 207 and an auxiliary storage device 208. These hardware pieces are communicably connected via a bus B.

The input device 201 includes, for example, a keyboard, a mouse, a touch panel and/or the like and is used for a user to input various instructions. The display device 202 is, for example, a display or the like and displays a result of processing by the estimation apparatus 10. Here, it is possible that the estimation apparatus 10 does not include at least one of the input device 201 and the display device 202.

The external I/F 203 is an interface with an external device. Examples of the external device include a recording medium 203a. The estimation apparatus 10 can perform, for example, reading and writing from/to the recording medium 203a via the external I/F 203. In the recording medium 203a, for example, one or more programs for implementing respective functional units included in the estimation apparatus 10 (for example, the input unit 101, the model parameter determination unit 102, the update unit 103, the termination determination unit 104 and the output unit 105) may be recorded.

Examples of the recording medium 203a include, for example, a flexible disk, a CD (compact disc), a DVD (digital versatile disk), an SD memory card (secure digital memory card) and a USB (universal serial bus) memory card.

The RAM 204 is a volatile semiconductor memory that temporarily holds a program and/or data. The ROM 205 is a non-volatile semiconductor memory that can hold a program and/or data even if power is turned off. In the ROM 205, for example, information on settings relating to an OS (operating system) and information on settings relating to the communication network are stored.

The processor 206 is an arithmetic device that reads a program and/or data from, for example, the ROM 205 or the auxiliary storage device 208 into the RAM 204 and performs processing such as, for example, a CPU (central processing unit) or a GPU (graphics processing unit). The respective functional units included in the estimation apparatus 10 are implemented by one or more programs stored in, for example, the ROM 205 or the auxiliary storage device 208 being read into the RAM 204 and the processor 206 performing processing.

The communication I/F 207 is an interface for connecting the estimation apparatus 10 with the communication network. The one or more programs that implement the respective functional units included in the estimation apparatus 10 may be acquired (downloaded) from, for example, a predetermined server device via the communication I/F 207.

The auxiliary storage device 208 is a non-volatile storage device that stores programs and/or data such as, for example, an HDD (hard disk drive) or an SSD (solid-state drive). Examples of the programs and/or the data stored in the auxiliary storage device 208 include, for example, the OS, application programs that implement respective functions on the OS and the one or more programs for implementing the respective functional units included in the estimation apparatus 10. The storage unit 106 included in the estimation apparatus 10 is implemented by, for example, the auxiliary storage device 208.

As a result of having the hardware configuration illustrated in FIG. 3, the estimation apparatus 10 according to the embodiment of the present invention can perform various type of processing described above. Note that the example illustrated in FIG. 3 indicates a case where the estimation apparatus 10 according to the embodiment of the present invention is provided by a single device (computer); however, the present invention is not limited to this case. The estimation apparatus 10 according to the embodiment of the present invention may be provided by a plurality of devices (computers). Also, the single device (computer) may include a plurality of processors 206 and/or a plurality of memories (for example, the RAM 204, the ROM 205 and the auxiliary storage device 208).

The present invention is not limited to the specifically disclosed embodiment above, and various alterations and changes are possible without departing from the scope of the claims.

REFERENCE SIGNS LIST 10 estimation apparatus
101 input unit
102 model parameter determination unit
103 update unit
104 termination determination unit
105 output unit

The invention claimed is:

1. An estimation apparatus comprising a processor configured to execute operations comprising:
    receiving aggregated data in which a plurality of data are aggregated, and feature data representing a feature of the aggregated data;
    determining a parameter of a model of the plurality of data before the aggregation of the aggregated data, using a predetermined function and the feature data; and
    estimating a parameter of the function and the plurality of data by optimizing a predetermined objective function, using the aggregated data, wherein the objective function is a likelihood indicating a degree of agreement between estimated values of the plurality of data and the parameter of the model, and the aggregated data.

2. The estimation apparatus according to claim 1, wherein:
    the estimating further comprises estimating the parameter of the function and the plurality of data in such a manner that the likelihood becomes high.

3. The estimation apparatus according to claim 2, wherein the model is one of a first order Markov model or a high order Markov model.

4. The estimation apparatus according to claim 3, wherein the estimator estimates the parameter of the function and the plurality of data in such a manner that the likelihood becomes high while a restriction between the aggregated data and the plurality of data being met.

5. The estimation apparatus according to claim 2, wherein the estimating further comprises estimating the parameter of the function and the plurality of data in such a manner that the likelihood becomes high while a restriction between the aggregated data and the plurality of data being met.

6. The estimation apparatus according to claim 1, wherein:
the aggregated data is population data of respective areas k at respective times t;
each of the plurality of data is data indicating a number of persons moved from an area k to an area k' at a time t; and
the feature data includes at least one of a vector representing a feature of the area k, a vector representing a feature of the time t and a vector representing a feature of the area k and the time t.

7. The estimation apparatus according to claim 1, wherein:
the function includes a neural network; and
the determining further comprises the parameter of the model by inputting the feature data to the function.

8. A computer-implemented method for estimating, comprising:
receiving, aggregated data in which a plurality of data are aggregated and feature data representing a feature of the aggregated data;
determining a parameter of a model of the plurality of data before the aggregation of the aggregated data, using a predetermined function and the feature data; and
estimating a parameter of the function and the plurality of data by optimizing a predetermined objective function, using the aggregated data, wherein the objective function is a likelihood indicating a degree of agreement between estimated values of the plurality of data and the parameter of the model, and the aggregated data.

9. The estimation method according to claim 8, wherein:
the estimating further comprises estimating the parameter of the function and the plurality of data in such a manner that the likelihood becomes high.

10. The estimation method according to claim 9, wherein the model is one of a first order Markov model or a high order Markov model.

11. The estimation method according to claim 10, wherein the estimating further comprises estimates the parameter of the function and the plurality of data in such a manner that the likelihood becomes high while a restriction between the aggregated data and the plurality of data being met.

12. The estimation method according to claim 9, wherein the estimating further comprises estimating the parameter of the function and the plurality of data in such a manner that the likelihood becomes high while a restriction between the aggregated data and the plurality of data being met.

13. The estimation method according to claim 8, wherein:
the aggregated data is population data of respective areas k at respective times t;
each of the plurality of data is data indicating a number of persons moved from an area k to an area k' at a time t; and
the feature data includes at least one of a vector representing a feature of the area k, a vector representing a feature of the time t and a vector representing a feature of the area k and the time t.

14. The estimation method according to claim 8, wherein:
the function includes a neural network; and
the determining further comprises determining the parameter of the model by inputting the feature data to the function.

15. A non-transitory computer readable recording medium storing computer-executable program instructions for estimating that when executed by a processor cause a computer system to:
receive aggregated data in which a plurality of data are aggregated and feature data representing a feature of the aggregated data;
determine a parameter of a model of the plurality of data before the aggregation of the aggregated data, using a predetermined function and the feature data; and
estimate a parameter of the function and the plurality of data by optimizing a predetermined objective function, using the aggregated data, wherein the objective function is a likelihood indicating a degree of agreement between estimated values of the plurality of data and the parameter of the model, and the aggregated data.

16. The non-transitory computer readable recording medium according to claim 15, wherein:
the estimating further comprises estimating the parameter of the function and the plurality of data in such a manner that the likelihood becomes high.

17. The non-transitory computer readable recording medium according to claim 16, wherein the model is one of a first order Markov model or a high order Markov model.

18. The non-transitory computer readable recording medium according to claim 16, wherein the estimating further comprises estimating the parameter of the function and the plurality of data in such a manner that the likelihood becomes high while a restriction between the aggregated data and the plurality of data being met.

19. The non-transitory computer readable recording medium according to claim 15, wherein:
the aggregated data is population data of respective areas k at respective times t;
each of the plurality of data is data indicating a number of persons moved from an area k to an area k' at a time t; and
the feature data includes at least one of a vector representing a feature of the area k, a vector representing a feature of the time t and a vector representing a feature of the area k and the time t.

20. The non-transitory computer readable recording medium according to claim 15, wherein:
the function includes a neural network; and
the determining further comprises determining the parameter of the model by inputting the feature data to the function.

* * * * *